(12) United States Patent
Rastelli et al.

(10) Patent No.: US 9,670,422 B2
(45) Date of Patent: Jun. 6, 2017

(54) PROCESS FOR THE REMOVAL OF MERCURY FROM HYDROCARBON STREAMS CONTAINING OXYGEN

(71) Applicant: UOP LLC, Des Plaines, IL (US)

(72) Inventors: Henry Rastelli, Gurnee, IL (US); Jayant K. Gorawara, Buffalo Grove, IL (US); Dante A. Simonetti, Los Angeles, CA (US)

(73) Assignee: UOP LLC, Des Plaines, IL (US)

( * ) Notice: Subject to any disclaimer, the term of this patent is extended or adjusted under 35 U.S.C. 154(b) by 219 days.

(21) Appl. No.: 14/549,510

(22) Filed: Nov. 20, 2014

(65) Prior Publication Data

US 2015/0159094 A1 Jun. 11, 2015

Related U.S. Application Data

(60) Provisional application No. 61/912,524, filed on Dec. 5, 2013.

(51) Int. Cl.
| | |
|---|---|
| *C10G 25/05* | (2006.01) |
| *B01D 53/02* | (2006.01) |
| *B01J 20/18* | (2006.01) |
| *B01J 20/34* | (2006.01) |
| *B01J 20/28* | (2006.01) |

(52) U.S. Cl.
CPC .............. *C10G 25/05* (2013.01); *B01D 53/02* (2013.01); *B01J 20/186* (2013.01); *B01J 20/28019* (2013.01); *B01J 20/28078* (2013.01); *B01J 20/3408* (2013.01); *B01J 20/3458* (2013.01); *B01D 2253/108* (2013.01); *B01D 2253/1122* (2013.01); *B01D 2253/308* (2013.01); *B01D 2256/24* (2013.01); *B01D 2256/245* (2013.01); *B01D 2257/602* (2013.01); *B01J 2220/56* (2013.01); *C10G 2300/205* (2013.01)

(58) Field of Classification Search
None
See application file for complete search history.

(56) References Cited

U.S. PATENT DOCUMENTS

| | | | |
|---|---|---|---|
| 4,101,631 A * | 7/1978 | Ambrosini ............. | B01D 53/02 423/210 |
| 4,196,173 A | 4/1980 | deJong et al. | |
| | | (Continued) | |

OTHER PUBLICATIONS

Barrer, "Mercury Uptake in Various Cationic Forms of Several Zeolites", J. Chem. Soc. (1967) 19-25.

(Continued)

*Primary Examiner* — Tam M Nguyen

(57) ABSTRACT

The invention relates to a process for removing and recovering mercury, an impurity, from a hydrocarbon feedstream containing oxygen, such as introduced during hydraulic fracturing. Mercury is selectively removed to very low levels of concentration from fluid streams such as natural gas, cracked gas, hydrogen or naphtha by passage of the stream through an adsorbent bed containing particles of a zeolitic molecular sieve preferably having pore diameters of at least 3.0 angstroms and in which the zeolite crystallites are formed into an aggregate (cylindrical or beads) which contain ionic or elemental silver. These adsorbent particles maintain their capacity for removal of mercury despite the presence of oxygen.

8 Claims, 1 Drawing Sheet

(56) References Cited

U.S. PATENT DOCUMENTS

| | | | |
|---|---|---|---|
| 4,500,327 A | | 2/1985 | Nishino et al. |
| 4,874,525 A | | 10/1989 | Markovs |
| 4,892,567 A | | 1/1990 | Yan |
| 5,271,760 A | | 12/1993 | Markovs et al. |
| 5,281,258 A | | 1/1994 | Markovs |
| 5,281,259 A | | 1/1994 | Markovs |
| 5,419,884 A | * | 5/1995 | Weekman .............. B01D 53/02 208/253 |
| 5,523,067 A | | 6/1996 | Markovs |
| 2012/0073811 A1 | | 3/2012 | Mock |
| 2012/0322696 A1 | | 12/2012 | Hayes et al. |
| 2013/0306312 A1 | | 11/2013 | O'Rear et al. |

OTHER PUBLICATIONS

Search Report dated Mar. 24, 2015 for corresponding PCT Appl. No. PCT/US2014/067991.

* cited by examiner

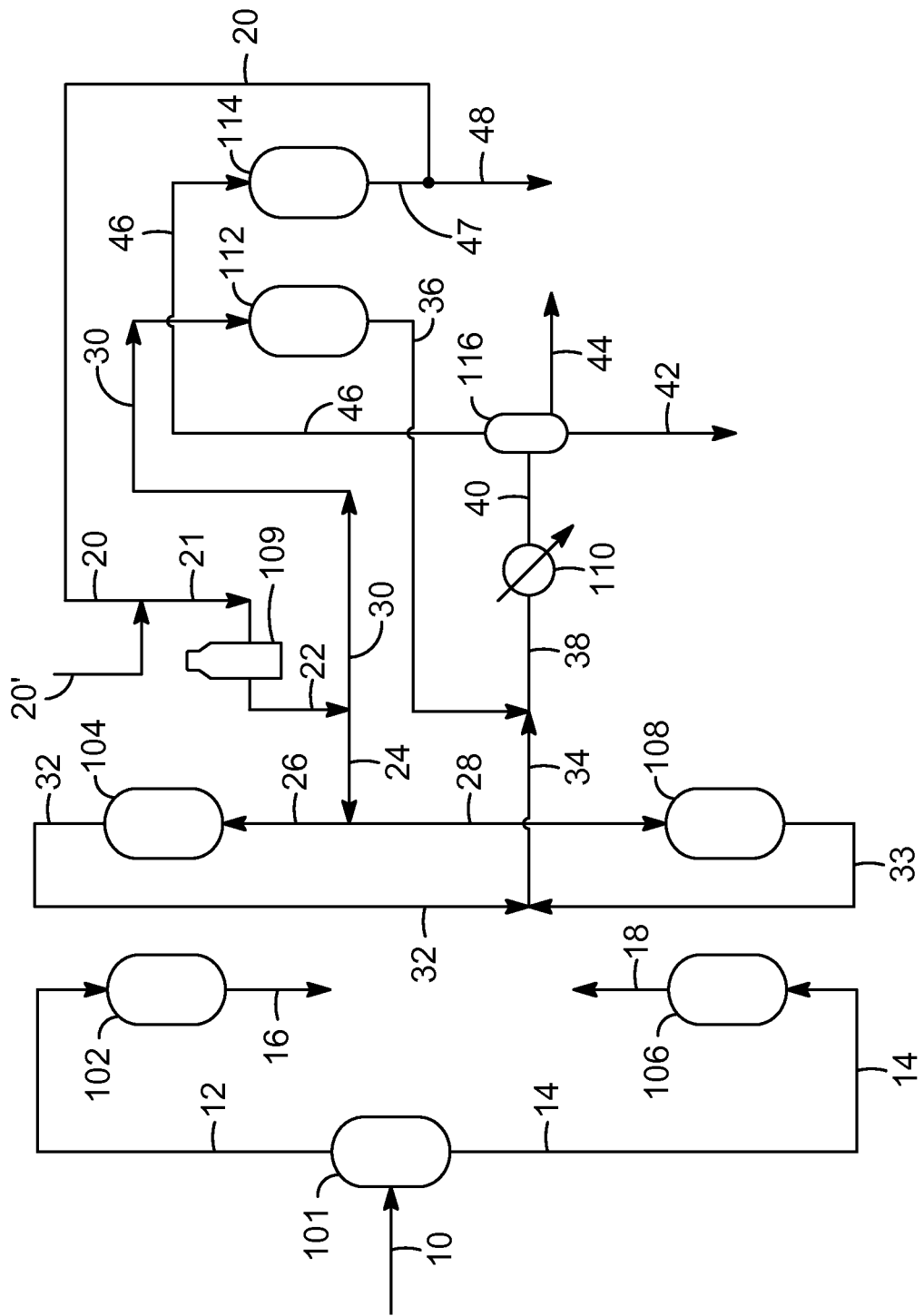

PROCESS FOR THE REMOVAL OF MERCURY FROM HYDROCARBON STREAMS CONTAINING OXYGEN

CROSS-REFERENCE TO RELATED APPLICATION

This application claims priority from Provisional Application No. 61/912,524 filed Dec. 5, 2013, the contents of which are hereby incorporated by reference.

BACKGROUND OF THE INVENTION

This invention relates in general to the removal of mercury present as an impurity in hydrocarbon streams, and more particularly to the removal and the recovery of mercury from gaseous and liquid hydrocarbons.

Mercury is an undesirable impurity found in many petrochemical process streams and in much of the natural gas found throughout the world. The mercury impurity present in such streams is generally in the form of elemental mercury, but in some instances the mercury is in the form of mercury compounds, including organic mercury compounds. Mercury impurities in process streams, particularly light hydrocarbon streams, that is, where the light hydrocarbons comprise methane ($C_1$) through $C_{10}$ hydrocarbons, may cause corrosion problems in process equipment or poison sensitive downstream catalytic and mechanical processes that produce either natural gas liquids (typically $C_2$-$C_4$ paraffins) or liquefied natural gas. The mercury can condense to the liquid state which is corrosive to the aluminum heat exchangers typically used in the cryogenic process. To remove mercury, several products have been produced such as mixed metal oxides (non-regenerative removal). Recently, with the advent of hydraulic fracturing (fracking) and horizontal drilling, the natural gas can contain small amounts of oxygen. This oxygen can have an adverse affect on some adsorbents and in particular on the mixed metal oxide adsorbents used for mercury removal. A considerable number of methods and schemes have been devised to selectively remove the mercury. The purification processes are most often based on adsorption technology where the mercury is selectively adsorbed on to the adsorbent. Some of these processes involve the use of non-regenerable adsorbents, but technology based on non-regenerable adsorbents usually results in the production of a solid adsorbent loaded with mercury and thus presents a hazardous waste disposal problem. One of the commonly used adsorbents for the removal of mercury is an activated carbon as a support for a mercury reactive material such as potassium triodide, sulfur, sulfuric acid, chlorine, silver, copper, or various salts of silver or copper. Other supports for mercury reactive materials include silicas, aluminas, silica-aluminas, and zeolitic aluminosilicates. Ion-exchange resins, particularly the strong basic anion-exchange types which have been reacted with a polysulfide, have also been reported as useful mercury adsorbents. See U.S. Pat. No. 4,591,490 (Horton) in this latter regard. The disclosures of U.S. Pat. No. 4,500,327 (Nishino) and U.S. Pat. No. 4,196,173 (de Jong et al.) are relevant to the use of activated carbon support for mercury reactive materials. U.S. Pat. No. 5,523,067 relates to processing both gas and liquid hydrocarbon streams containing mercury.

U.S. Pat. No. 5,281,258 to Markovs discloses a process for removing mercury vapor from a natural gas stream which comprises mercury and water. The natural gas stream is passed through a first fixed bed adsorber containing a regenerable adsorbent which adsorbs mercury and water and a purified effluent is recovered. The flow of the natural gas stream to the first adsorber bed is terminated and a heated purge desorbent stream is passed through the first adsorbent bed to desorb mercury and water to produce a spent regenerant. The spent regenerant is cooled and condensed to recover liquid mercury and water. The remainder of the spent regenerant is passed to a second fixed bed adsorber containing a regenerable adsorbent with a strong affinity for adsorbing water to produce a second effluent, decreased in water. The second effluent is cooled and condensed to condense out a portion of the mercury from the second effluent. The second fixed bed adsorber is regenerated with a portion of the heated purge desorbent and is not recovered. The second fixed bed adsorber is required to remove water prior to the condensing out of the mercury to prevent hydrate formation.

U.S. Pat. No. 5,281,259 to Markovs discloses a process for the removal of mercury from a natural gas stream wherein the mercury vapor contained in the purge gas used to regenerate the adsorption beds is recovered as liquid mercury. In this scheme, a primary spent purge desorbent from a primary bed undergoing desorption is cooled and condensed to recover mercury and water and the remaining material is passed to a secondary bed containing a regenerable adsorbent for mercury to produce a second effluent stream depleted in mercury. Another secondary bed undergoing regeneration at the same time as the primary bed is purged with a portion of the purge desorbent to produce a secondary spent regenerant. The secondary spent regenerant is combined with the primary spent desorbent prior to the cooling and condensing step.

U.S. Pat. No. 5,271,760 to Markovs discloses a process for the removal of mercury from a process feedstream containing liquid mercury. The process comprises the passing of the feedstream periodically in sequence through two fixed beds containing a regenerable adsorbent selective for the adsorption of mercury. Each of the beds cyclically undergoes an adsorption step wherein the feedstream is passed through the bed to selectively adsorb mercury and to produce an effluent stream, and a purge desorption step wherein the adsorbed mercury is desorbed by passing a regeneration fluid through the bed to produce a second effluent. The improvement comprises the tandem operation of the beds so that as one bed is operating in the adsorption step, the other bed is operating in the purge desorption step and the second effluent is cooled and condensed to recover a portion of the mercury. Markovs further discloses that the remainder of the second effluent is recombined with the feedstream and passed to the bed undergoing adsorption. The above U.S. Pat. Nos. 5,281,258, 5,281,259, and U.S. Pat. No. 5,271,760 are hereby incorporated by reference.

The majority of natural gas being produced in the United States is from wells that are being hydraulically fractured. In a typical well, the fracturing liquid is about 99.5% water and sand with the remainder being common chemicals. Oxygen is also known to be introduced into the well through the use of these fracturing liquids. Currently metal oxide adsorbents are being used for mercury removal. However, oxygen can have an adverse effect on the removal of mercury. Purification processes and adsorbents are needed for the removal of mercury from hydrocarbon streams, including natural gas streams, containing oxygen.

Elemental mercury is a known contaminant in natural gas deposits. When natural gas is subjected to cryogenic processes to produce either natural gas liquids (typically $C_2$-$C_4$ paraffins) or liquefied natural gas, the mercury can condense to the liquid state. Mercury in the liquid state is corrosive to the aluminum heat exchangers typically used in the cryogenic process. To remove mercury, several products have been produced such as mixed metal oxides (non-regenerative removal) and UOP HgSIV products (regenerable removal). Recently, with the advent of fracking and horizontal drilling, the natural gas can contain small amounts of oxygen. This oxygen can have an adverse affect on the mixed metal oxide adsorbents used for mercury removal.

Purification processes are sought for the high recovery of mercury from both gaseous and liquid hydrocarbon streams that contain oxygen.

SUMMARY OF THE INVENTION

The invention provides a process for the removal and recovery of mercury as a liquid stream from a hydrocarbon feedstream that contains oxygen.

It has been found that silver-containing zeolites for the selective removal of mercury from fluid streams containing oxygen can be achieved without a corresponding reduction in the effectiveness of the process as compared to fluid streams that do not contain oxygen. It is quite unexpected that the adsorbents that were used maintained their effectiveness in the presence of oxygen.

UOP HgSIV is a unique regenerable adsorbent which uses silver to amalgam the mercury and remove it from the gas stream. Since the silver is used in the reduced metal form, one may expect that the silver when exposed to oxygen would oxidize and become ineffective. Laboratory testing with air (21% $O_2$) proved that the silver metal is stable to air and removes mercury with the same efficiency as in a natural gas stream that does not contain small amounts of oxygen. Therefore, even if there is a small amount of oxygen present in the natural gas, the silver containing adsorbent is still effective at removing the mercury and the adsorbent can then be regenerated.

BRIEF DESCRIPTION OF THE DRAWING

The FIGURE represents a schematic block flow diagram of the process of the present invention wherein a hydrocarbon feedstream is separated into a gaseous portion and a liquid portion and both portions are separately treated for removal of mercury while adsorption zones for such treatment are regenerated with common heating and mercury recovery.

DETAILED DESCRIPTION OF THE INVENTION

Preferred adsorbents are those which comprise constituents chemically reactive with mercury or mercury compounds. Various cationic forms of several zeolite species, including both naturally occurring and synthesized compositions, have been reported by Barrer et al., J. CHEM. Soc. (1967) pp. 19-25, to exhibit appreciable capacities for mercury adsorption due to the chemisorption of metallic mercury at the cation sites. Some of these zeolitic adsorbents reversibly adsorb mercury and others exhibit less than full, but nevertheless significant, reversibility. An especially effective adsorbent for use in the present process is one of the zeolite-based compositions containing cationic or finely dispersed elemental forms of silver, gold, platinum or palladium. A particularly preferred adsorbent of this type is disclosed in U.S. Pat. No. 4,874,525 (Markovs) wherein the silver is concentrated on the outermost portions of the zeolite crystallites. This adsorbent, as well as the other zeolite-based adsorbents containing ionic or elemental gold, platinum, or palladium, is capable of selectively adsorbing and sequestering organic mercury compounds as well as elemental mercury. Zeolite A containing elemental gold is disclosed as an adsorbent for mercury in the later issued U.S. Pat. No. 4,892,567 (Yan). The specific mention of these materials is not intended to be limiting, the composition actually selected being a matter deemed most advantageous by the practitioner given the particular circumstances to which the process is applied.

The temperature and pressure conditions for the filtration and the adsorption purification steps are not critical and depend to some degree upon the particular feedstock being purified and whether the adsorption step is to be carried out in the liquid or in the vapor phase. Temperatures typically range from about 16° to 60° C. in the beds during the adsorption-purification step. If the adsorption bed is to be regenerated, the purge medium is heated to approximately 200° C. or more. Pressure conditions can range from about 140 kPa to about 17.5 Mpa (20 to 2500 psia) and are generally not critical, except of course during liquid phase operation wherein it is necessary to maintain sufficient pressure at the operating temperature to avoid vaporization of the feedstock.

DETAILED DESCRIPTION OF THE DRAWING

The following is one embodiment of the invention. Modifications within the scope of one skilled in the art may also be employed. With reference to the FIGURE, a hydrocarbon feedstream comprising $C_1$ to $C_{10}$ hydrocarbons, mercury, oxygen and water is passed via line 10 to a separation zone 101 wherein the hydrocarbon feedstream is separated to produce a gaseous stream 12 comprising primarily $C_1$-$C_3$ hydrocarbons, mercury and water, and a liquid hydrocarbon stream 14 comprising primarily $C_3$+ hydrocarbons, mercury, and water. The gaseous stream 12 is passed to a first gas purifier bed 102 of typically two gas purifier beds (102 and 104), and a treated gas effluent stream having a reduced amount of mercury relative to the gaseous stream is withdrawn in line 16. Gas purifier bed 102 is shown operating in the adsorption mode while gas purifier bed 104 is shown in the desorption mode. Prior to mercury breakthrough, the operation is switched by techniques well known in the gas adsorption art and the first gas purifier bed 102 is regenerated while the other gas purifier bed 104 is placed in the adsorption mode. Each of the gas purifier beds typically comprises fixed beds containing a first adsorbent zone selective for the reversible adsorption of water and a second adsorbent zone for the reversible adsorption of water and mercury from the gaseous stream 12. Preferably, the first adsorbent zone contains a zeolite adsorbent selected from the group consisting of zeolite A, zeolite X, and the second adsorbent zone contains an adsorbent selected from the group consisting of zeolite A, zeolite X, and zeolite Y containing cationic or finely dispersed elemental forms of a metal selected from the group consisting of silver, gold, platinum, palladium, and mixtures thereof. More preferably, the first adsorbent zone contains a desiccant comprising zeolite A, or zeolite X, and a second adsorbent layer comprising zeolite A or zeolite X containing ionic or elemental silver.

The liquid hydrocarbon stream 14 is passed to a first liquid purifier bed 106 which is the first liquid purifier bed of typically at least two liquid purifier beds (106 and 108) and a treated liquid effluent having a reduced amount of mercury relative to the liquid hydrocarbon stream is withdrawn in line 18. Each of the liquid purifier beds, like the gas purifier beds, typically comprises a fixed bed containing a first adsorbent zone containing a desiccant such as zeolite A or X, and a second adsorbent zone selective for the reversible adsorption of water and mercury such as a molecular sieve zeolite selected from the group consisting of zeolite A, zeolite X, and zeolite Y containing cationic or finely dispersed elemental forms of a metal selected from the group consisting of silver, gold, platinum, palladium, and mixtures thereof. Preferably the second adsorbent zone of the liquid purifier bed comprises a zeolite A or zeolite X containing ionic or elemental silver. Liquid purifier bed 106 is shown in the adsorption mode while liquid purifier bed 108 is shown in a desorption mode. The operation of the liquid purifier beds 106 and 108 is periodically switched between adsorption and desorption mode prior to the breakthrough of mercury into the treated liquid effluent stream 18.

In the regeneration mode, a regenerant stream 20 typically comprising $C_1$-$C_2$ hydrocarbons is passed via line 20 and 21 to heater 109 to provide a heated regenerant stream 22. Preferably, the heated regenerant stream is heated to a regeneration temperature greater than about 200° C., and more preferably, the heated regenerant stream is heated to a regeneration temperature between about 200° and about 350° C. According to the present invention, the gas purifier bed 104 and the liquid purifier bed 108 are regenerated in a sequential manner using a common mercury recovery zone. The heated regenerant stream 22 is passed to gas purifier 104 in a direction countercurrent to the flow of gas during the adsorption mode to desorb mercury and water and to produce a spent regenerant stream 32 comprising mercury and water. The spent regenerant stream 32 is passed via lines 32, 34, and 38 to a cooler/separator comprising cooler 110 and separator 116, connected by line 40. Cooler 110 cools the spent regenerant stream to condense a portion of the mercury and a portion of the water desorbed from the first adsorbent zone to produce a cooled regenerant stream 46, a water stream 44, and a mercury stream 42. In some embodiments mercury will instead be removed in its gaseous form. The cooled regenerant stream 46 is passed to a first secondary adsorption bed 114 of at least two secondary adsorption beds (114 and 112) to produce a purified gas stream 47 containing less than about 0.1 μg/Nm³ of mercury. Each of the secondary adsorption beds like the gas purifier beds, and the liquid purifier beds comprises a fixed bed containing a first adsorbent zone containing a desiccant such as zeolite A or X, and a second adsorbent zone selective for the reversible adsorption of water and mercury such as a molecular sieve zeolite selected from the group consisting of zeolite A, zeolite X, and zeolite Y containing cationic or finely dispersed elemental forms of a metal selected from the group consisting of silver, gold, platinum, palladium, and mixtures thereof. Preferably the second adsorbent zone of the liquid purifier bed comprises a zeolite A or zeolite X containing ionic or elemental silver. The purified gas stream 47 is withdrawn for use as plant fuel via line 48. At least a portion of the purified gas stream 47 may be combined with the regenerant stream 20' via line 20. When the mercury has been removed from the first gas purifier bed 104, the passing of heated regenerant 26 to bed 104 and the passing of the spent regenerant stream 32 are terminated and the heated regenerant 28 is passed to the liquid purifier 108 in a direction countercurrent to the liquid flow during the adsorption mode to produce a second spent regenerant stream 33 which has approximately the same composition as the spent regeneration stream 32 comprising mercury and water. The second spent regenerant stream 33 is passed to the cooler/separator via lines 33, 34, and 38 to produce the cooled regenerant stream 46, the water stream 44, and the mercury stream 42. The cooled regenerant stream 46 continues to be passed to the first secondary adsorbent bed 114 for the production of the purified gas stream 47. Preferably the temperature of the cooled regenerant stream ranges between about 20° and about 45° C., and more preferably the temperature of the cooled regenerant steam is less than about 25° C. When the liquid purifier bed 108 has been regenerated, the passing of the heated regenerant stream thereto and the passing of the second spent regenerant stream 33 are terminated and the heated regenerant stream 22 is passed to the other secondary adsorbent bed 112 via line 30 in a direction countercurrent to the gas flow during the adsorption mode to desorb mercury and water and to produce the third spent regenerant stream 36. The third spent regenerant stream 36 is passed to the cooler 110/separator 116 to provide the cooled regenerant stream 46, the water stream 44, and the mercury stream 42. The cooled regenerant stream is passed to the first secondary adsorbent bed 114 to produce the purified gas stream 47. Thus, the regeneration of the gas purifier bed 104, the liquid purifier bed 108, and the secondary adsorbent bed 112 is carried out sequentially with a common cooler 110/separator 116 to provide a continuous process and a continuous regeneration cycle. Preferably, the total regeneration cycle time including cooling the beds to adsorption conditions comprises 30-60 percent for the regeneration of the gas purifier bed, 20-50 percent for the regeneration of the liquid purifier bed, and 5-20 percent for the regeneration of the secondary adsorbent bed. Following the termination of passing heated regenerant to each of the beds undergoing regeneration, the beds are cooled by the passing of unheated regenerant or purified gas in the conventional manner.

EXAMPLE

Two samples were compared, one sample was in nitrogen feed gas and the other sample was in air. In both samples, 10 g of adsorbent used. The bed height was 10 cm, bed volume 7.2 mL and the nominal feed flowrate was 1200 mL/min. In the first sample, using nitrogen, the nominal inlet Hg concentration was 802 μg/m³ and in the sample containing air, the nominal inlet Hg concentration was 975 μg/m³. It was found that the loading of Hg vs. time of stream was about the same for both the sample in nitrogen and the sample in air.

SPECIFIC EMBODIMENTS

While the following is described in conjunction with specific embodiments, it will be understood that this description is intended to illustrate and not limit the scope of the preceding description and the appended claims.

A first embodiment of the invention is a process for the removal of mercury vapor from a fluid stream containing hydrocarbons and oxygen comprising passing the stream through an adsorbent bed containing particles comprised of crystallites of a zeolitic molecular sieve having pore diameters of at least 3.0 angstroms and in which the zeolite crystallites are formed into an aggregate as pellets or beads with clay which contain elemental silver, whereby at least a major proportion of the mercury is adsorbed and a purified effluent fluid stream is recovered. An embodiment of the invention is one, any or all of prior embodiments in this paragraph up through the first embodiment in this paragraph wherein the zeolite crystallites of the adsorbent particles containing silver comprise zeolite X or zeolite Y or zeolite A. An embodiment of the invention is one, any or all of prior embodiments in this paragraph up through the first embodiment in this paragraph wherein the fluid stream being treated for mercury removal comprises natural gas. An embodiment of the invention is one, any or all of prior embodiments in this paragraph up through the first embodiment in this paragraph wherein the natural gas contains both water vapor and mercury as impurity constituents and both impurities are removed by passage of the stream through a compound bed containing a desiccant adsorbent and the silver-containing adsorbent, and thereafter regenerating both adsorbent materials by passage through the compound bed of a non-sorbable purge gas at a temperature higher than employed during the adsorption stage. An embodiment of the invention is one, any or all of prior embodiments in this paragraph up through the first embodiment in this paragraph wherein the silver-containing adsorbent is contained within a discrete zone of the compound bed. An embodiment of the invention is one, any or all of prior embodiments in this paragraph up through the first embodiment in this paragraph wherein the hydrocarbon stream is treated in the liquid phase.

A second embodiment of the invention is a process for removing mercury from a feedstock fluid stream containing the mercury and containing oxygen which comprises (a) passing the stream in the liquid phase through an adsorbent bed containing as an adsorbent particles comprised of crystallites of a zeolitic molecular sieve having pore diameters of at least 3.0 angstroms and in which the zeolite crystallites are formed into an aggregate shape (cylindrical or beads) that contain elemental silver, whereby mercury is adsorbed and a purified product stream is recovered as an effluent from the bed; (b) periodically regenerating the bed by the passage as a purge gas therethrough of a portion of the purified product in the vapor phase; and (c) condensing the effluent from the bed during regeneration and recovering the liquid phase mercury for the liquefied purge gas. An embodiment of the invention is one, any or all of prior embodiments in this paragraph up through the second embodiment in this paragraph wherein the bed regeneration is carried out by passing the purge gas stream through the bed in a direction counter-current to the direction of flow through the bed during the purification adsorption step. An embodiment of the invention is one, any or all of prior embodiments in this paragraph up through the second embodiment in this paragraph wherein the feedstock being purified is naphtha.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for removing mercury from a feedstock fluid comprising:
    separating a feedstock fluid comprising mercury and containing oxygen into a liquid phase and a gaseous phase;
    passing the liquid phase through an liquid purifier bed containing adsorbent particles comprised of crystallites of a zeolitic molecular sieve having pore diameters of at least 3.0 angstroms and in which the said zeolite crystallites are formed into an aggregate cylindrical or beads which contain elemental silver, whereby mercury is adsorbed and a liquid effluent stream is recovered from the liquid purifier bed;
    passing the gaseous phase through a gas purifier bed containing adsorbent particles comprised of crystallites of a zeolitic molecular sieve having pore diameters of at least 3.0 angstroms and in which the said zeolite crystallites are formed into an aggregate cylindrical or beads which contain elemental silver, whereby mercury is adsorbed and a gas effluent stream is recovered from the gas purifier bed; and,
    regenerating the gas purifier bed by the passage as a purge gas therethrough of a portion of the gas effluent stream, the liquid effluent stream, or both; and,
    regenerating the gas purifier bed by the passage as a purge gas therethrough of a portion of the gas effluent stream, the liquid effluent stream, or both.

2. The process of claim 1 further comprising:
    condensing purge gas from the gas purifier bed, the liquid purifier bed, or both and recovering a liquefied purge gas comprising liquid mercury.

3. The process according to claim 1 wherein the crystallites of molecular sieve of the adsorbent particles containing silver comprise zeolite X or zeolite Y or zeolite A.

4. The process according to claim 3 wherein the feedstock fluid being treated for mercury removal comprises natural gas.

5. The process according to claim 4 wherein the natural gas contains both water vapor and mercury as impurity constituents and both impurities are removed by passage of the stream through a compound bed containing a desiccant adsorbent and said silver-containing adsorbent, and thereafter regenerating both adsorbent materials by passage through said compound bed of a non-sorbable purge gas at a temperature higher than employed during the adsorption stage.

6. The process according to claim 5 wherein the silver-containing adsorbent is contained within a discrete zone of the compound bed.

7. The process according to claim 1 wherein the bed regeneration is carried out by passing the purge gas through the bed in a direction counter-current to the direction of flow through the bed during the purification adsorption step.

8. The process according to claim 7 wherein the feedstock being purified is naphtha.

* * * * *